Patented Dec. 19, 1933

1,940,428

UNITED STATES PATENT OFFICE 1,940,428

PROCESS FOR RECOVERING GLUTAMIC ACID

Reisuke Masuda, Toledo, Ohio, assignor to The Larrowe-Suzuki Company, Rossford, Ohio, a corporation of Ohio No Drawing. Application September 10, 1932
Serial No. 632,636

5 Claims. (Cl. 260—119)

This invention relates to a novel method of recovering d-glutamic acid from crude materials also containing interfering amounts of inorganic salts, and has, as a general object, the provision of a method by which high yields of relatively pure d-glutamic acid may be recovered from such materials in a simple, convenient, efficient and economical manner.

A more particular object of the invention is to provide a method of recovering d-glutamic acid from crude materials, also containing inorganic salts in which, by a correlation of the concentrations, acidities and temperatures used, the interfering amounts of inorganic salts are crystallized out and removed at a temperature above that at which the d-glutamic acid crystallizes out, and in which the remaining solution is thereafter diluted and cooled to crystallize out "relatively pure" d-glutamic acid, i. e. without the inclusion of substantial percentages of inorganic salts, as hereinafter pointed out.

Other objects of the invention will in part be obvious and will in part appear hereinafter.

The invention accordingly comprises the several steps and the relation of one or more of such steps with respect to each of the others, which are exemplified in the following detailed disclosure, and the scope of the application of which will be indicated in the claims.

In the art of manufacturing d-glutamic acid, it is known that the acid may be produced either by the alkaline or acid hydrolysis of suitable raw materials, such as vegetable proteins, wheat gluten, animal proteins, casein, and the like as well as the more impure materials such as beet molasses, molasses residues such as distillery slops, and desaccharified beet molasses, for example Steffen's waste water. Heretofore, various methods of recovering the d-glutamic acid in various degrees of purity from such hydrolysates have been suggested, a principal problem being the elimination of the inorganic salt impurities and, of course, the efficient recovery of the d-glutamic acid of a relatively high purity. In those processes in which raw materials containing naturally occurring inorganic salts are used, it has frequently been customary to subject the raw material to a preliminary treatment in an attempt to eliminate as much as possible of the inorganic salts and, even with such previously treated raw materials, as well as with other raw materials in which, during the hydrolyzing and subsequent treatments, inorganic salts are formed, the differential separation of the d-glutamic acid therefrom has been a considerable problem. In so far as the present applicant is aware, this separation of inorganic salts has always heretofore been accomplished by cooling the solution at a suitable concentration and, after this separation, changing the acidity of the solution and allowing it to stand until the d-glutamic acid crystallized out.

The present improved method is applicable to any of the hydrolysates mentioned, and may also with benefit be used in the purification of d-glutamic acid which is contaminated with inorganic salts after it has been crystallized out from such hydrolysates; and, as above pointed out, the method accomplishes the separation rapidly and efficiently without the necessity of either first separating the salts or of subsequently cooling the solution to separate the salts.

By the use of the present method, high yields such, as for example 90% or above of d-glutamic acid, having a purity of from 87% to 95% can be readily obtained; and by the term "relatively pure", as used hereinafter, applicant means to include d-glutamic acid having a purity of this general nature.

Considered generally, the present improved method comprises preparing a hot concentrated acidified solution of d-glutamic acid, cooling sufficiently to crystallize out subsequently interfering amounts of inorganic salts and removing the same, diluting the remaining solution sufficiently to prevent subsequent substantial crystallization of the remaining inorganic salts, and finally cooling the said remaining solution and allowing it to stand to crystallize out the d-glutamic acid in a relatively pure state, and separating it.

As a specific example of utilizing the principles of the present invention, but not by way of limitation, the following example is given, in which Steffen's waste water is the raw material which has been hydrolyzed. The hot hydrolysate is concentrated and acidified, if necessary, until it has a specific gravity of from 1.38 to 1.55 (preferably about 1.47) at 65° C., and a pH of between 2.8 and 3.6 (preferably about 3.2). If the hydrolysis has been accomplished by alkaline treatment, it is important that, prior to concentration, the hydrolysate should be acidified sufficiently to prevent racemization as, for example, to a pH of 5 or less.

The concentrated and acidified hot hydrolysate is then partially cooled to a temperature of between 40° C. and 80° C., preferably around 60° C., and is held at this temperature until that portion of the inorganic salts which would subsequently interfere with the crystallization and the removal of the d-glutamic acid in a relatively pure state has crystallized out, whereupon these crystallized salts are removed in any suitable manner, as for example by centrifuging. The remaining solution is then diluted with about one-fifth of its volume of water, e. g. to a concentration of about 55 grams of d-glutamic acid per liter, at which concentration the d-glutamic acid will, upon cooling to room temperature, gradually crystallize out in a period of from three to six days, and the residual inorganic salts will, for the most part, remain in solution so that high yields of relatively pure d-glutamic acid are obtained.

While the above example relates to the use of a hydrolysate from Steffen's waste water, it will be apparent to one skilled in the art that applicant's novel method is readily applicable to the recovery of d-glutamic acid from other crude materials containing contaminating amounts of inorganic salts; and since certain changes in carrying out the above process may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language might be said to fall therebetween. Particularly it is to be understood that in said claims, ingredients or compounds recited in the singular are intended to include compatible mixtures of such ingredients wherever the sense permits.

Having described my invention, what I claim as new and desire to secure by Letters Patent, is:

1. The method of recovering relatively pure d-glutamic acid from a crude material thereof containing inorganic salts, which comprises preparing a hot concentrated acidified solution of said crude material, cooling sufficiently to crystallize out subsequently interfering amounts of inorganic salts and removing same, diluting the remaining solution sufficiently to prevent substantial crystallization of the remaining inorganic salts, and finally cooling the said remaining solution to crystallize out the d-glutamic acid in a relatively pure state and separating it, while the remaining inorganic salts are substantially retained in solution.

2. The method of recovering relatively pure d-glutamic acid from a crude material thereof containing inorganic salts, which comprises preparing a hot concentrated acidified solution of said crude material, cooling sufficiently to crystallize out subsequently interfering amounts of inorganic salts and removing same, diluting the remaining solution sufficiently to retain the major proportion of the remaining inorganic salts in solution when said solution is cooled to a point at which d-glutamic acid will crystallize out, and finally cooling the said remaining solution to crystallize out the d-glutamic acid in a relatively pure state and separating it while the remaining inorganic salts are substantially retained in solution.

3. A method of recovering relatively pure d-glutamic acid from a crude material thereof containing inorganic salts in larger proportion than the glutamic acid, which comprises forming a hot solution of said crude material having a concentration and an acidity such that the larger proportion of the inorganic salts will crystallize out but the d-glutamic acid will remain in solution when the hot solution is partially cooled, cooling said solution to crystallize out subsequently interfering amounts of inorganic salts while retaining the d-glutamic acid in solution, removing the thus crystallized inorganic salts, diluting the remaining solution to a point such that upon further cooling the d-glutamic acid will crystallize out in a relatively pure state but the remaining inorganic salts will substantially stay in solution finally cooling the said remaining solution to crystallize out the d-glutamic acid while retaining the remaining inorganic salts in solution, and thereafter separating the crystallized d-glutamic acid.

4. The method of recovering relatively pure d-glutamic acid from a crude material thereof containing inorganic salts in larger proportion than the glutamic acid, which comprises preparing a hot solution of said crude material having a concentration of between 1.38 and 1.55 specific gravity at 65° C., and an acidity of between 2.8 and 3.6 pH, cooling the solution to a temperature of between 40° and 80° C. to crystallize out subsequently interfering amounts of inorganic salts while retaining the d-glutamic acid in solution, removing the thus crystallized inorganic salts, diluting the remaining solution to a point such that upon further cooling the d-glutamic acid will crystallize out in a relatively pure state but the remaining inorganic salts will substantially stay in solution, finally cooling the said remaining solution to crystallize out the d-glutamic acid while substantially retaining the remaining inorganic salts in solution, and thereafter separating the crystallized d-glutamic acid.

5. The method of recovering relatively pure d-glutamic acid from a hydrolysate of Steffen's waste water, which comprises preparing a hot solution of said hydrolysate having a concentration of about 1.47 specific gravity at 65° C. and an acidity of about 3.2 pH, partially cooling to about 60° C. to crystallize out subsequently interfering amounts of inorganic salts, diluting the remaining solution until it contains about 55 grams d-glutamic acid per liter, and finally cooling said remaining solution to crystallize out the d-glutamic acid in a relatively pure state while substantially retaining the residual inorganic salts in solution, and thereafter separating the crystallized d-glutamic acid.

REISUKE MASUDA.